Oct. 14, 1969    M. H. BERLY    3,472,104
THREAD-CUTTING DEVICE
Filed Dec. 20, 1966    3 Sheets-Sheet 1

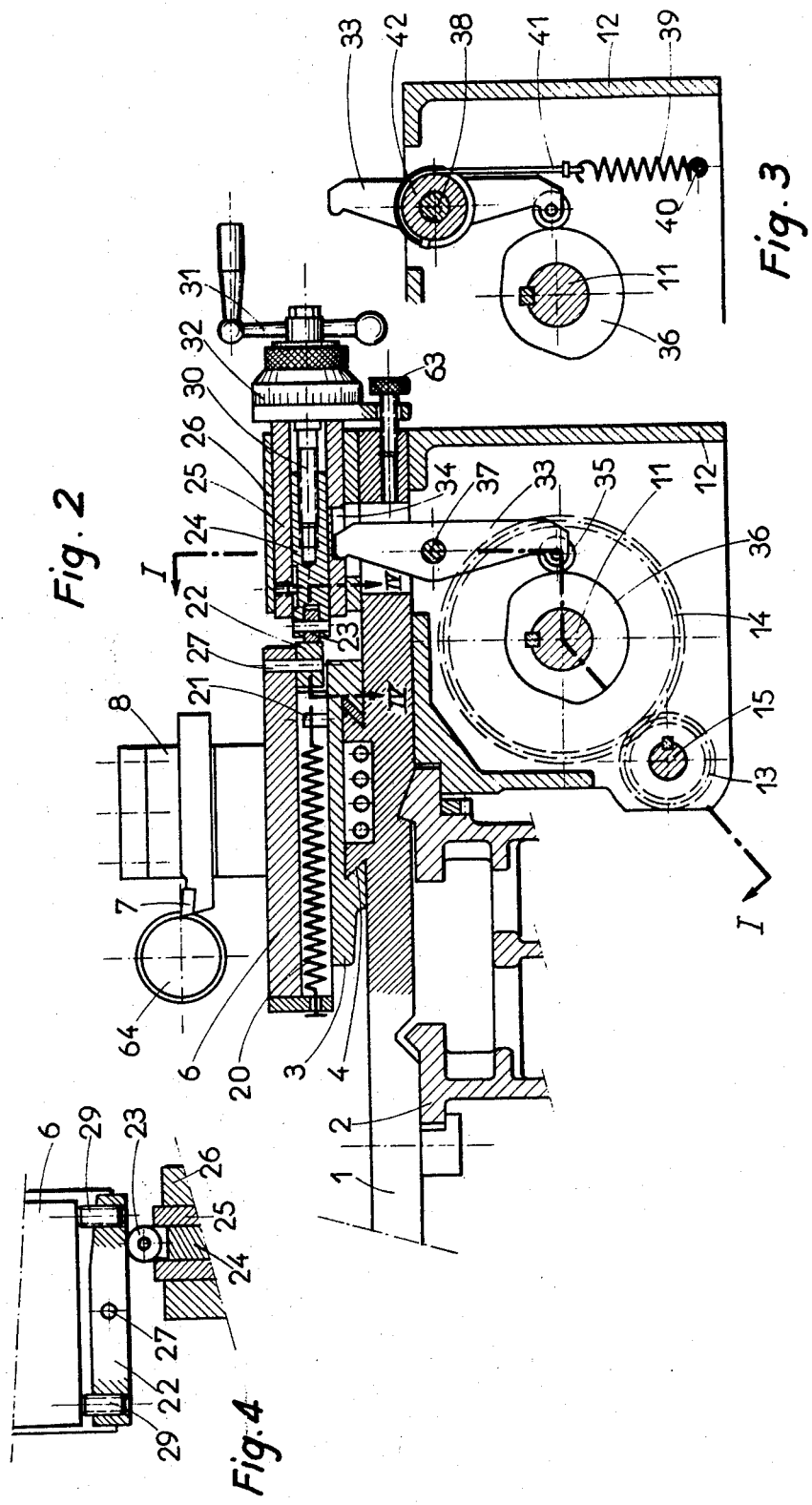

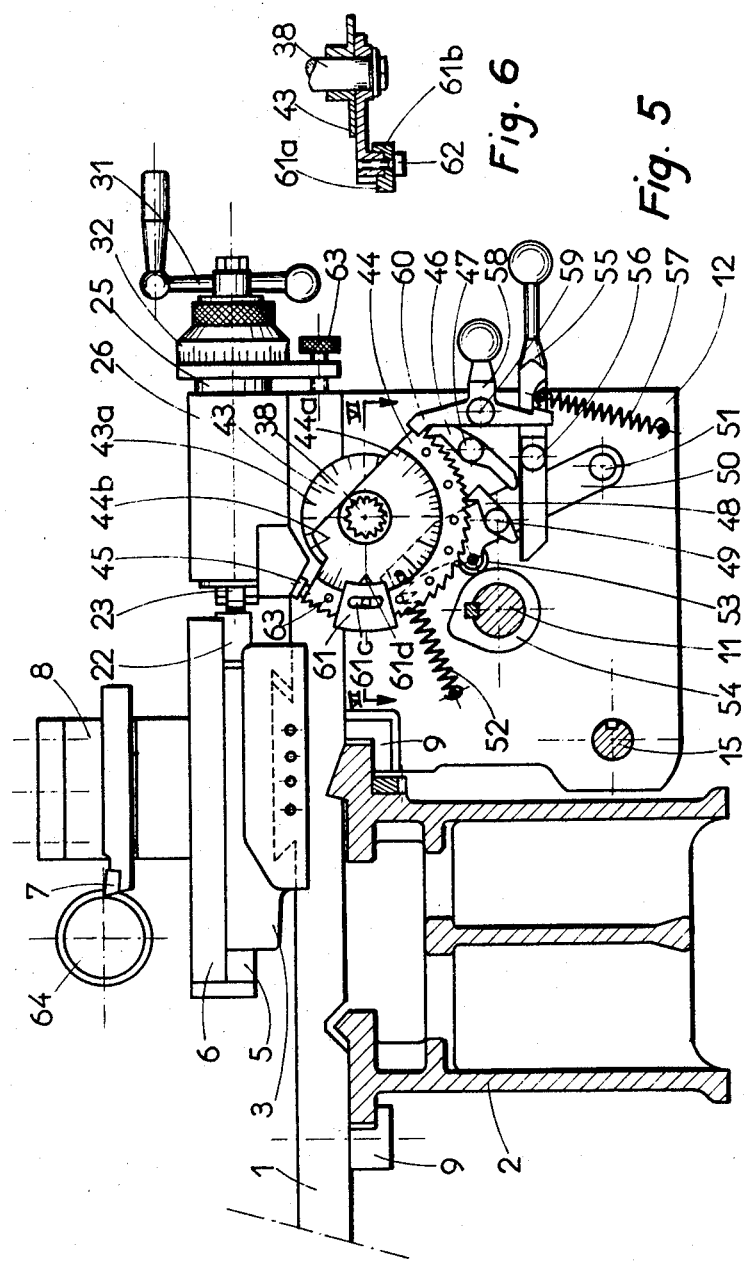

United States Patent Office 3,472,104
Patented Oct. 14, 1969

3,472,104
THREAD-CUTTING DEVICE
Marcel Henri Berly, Hauts-de-Seine, France, assignor to
H. Ernault-Somua, Paris, France, a French company
Filed Dec. 20, 1966, Ser. No. 603,253
Claims priority, application France, Dec. 27, 1965,
43,751
Int. Cl. B23b 1/00
U.S. Cl. 82—5                    4 Claims

ABSTRACT OF THE DISCLOSURE

A screw thread-cutting machine is provided in which a longitudinal carriage is slidably mounted on a frame and carries a cam follower which is urged against a first rotatable cam on a frame by a bias force on the carriage. A transverse carriage is slidably mounted on the longitudinal carriage and a second cam follower is carried on a pivotal lever mounted on an eccentric shaft pivotably supported in the frame, the lever having a portion forming an abutment against which the transverse carriage is urged. The second cam follower engages a second rotatable cam on the frame, and a ratchet device is actuated by a third rotatable cam to impart successive angular increments to the eccentric shaft, all three cams being coupled to a common drive shaft for simultaneous rotation.

---

Figure 1:
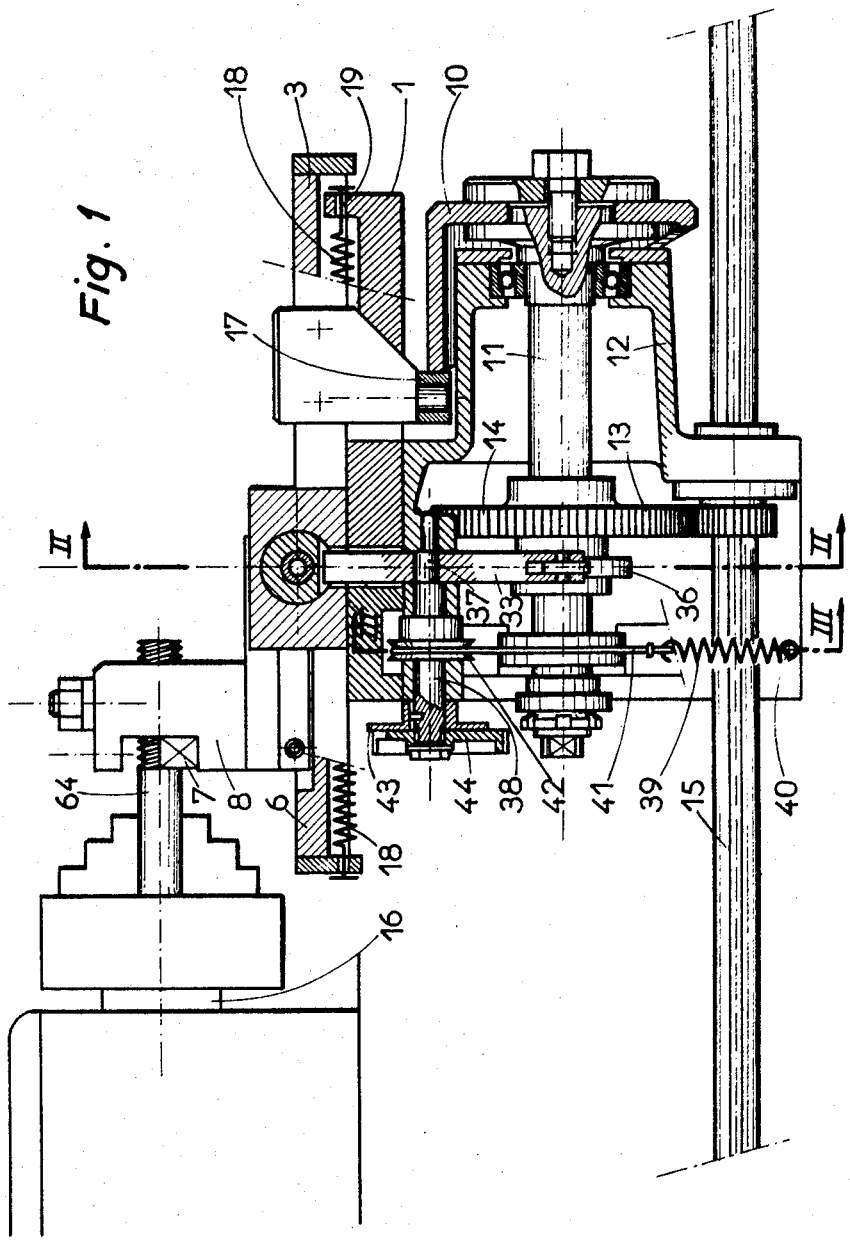

This invention relates to a thread-cutting device, intended for use with a parallel traversing and thread-cutting lathe.

Heretofore proposed thread-cutting devices usually comprise a longitudinally displaceable carriage disposed on the lathe saddle, and controlled by a cam whose rotary speed is linked with that of the lathe spindle according to a specific ratio corresponding to the pitch of the thread being formed. On this carriage is guided a transversely displaceable carriage carrying the thread-cutting tool and constantly subjected to the action of a resilient return force in the direction of tool withdrawal, the transverse advance movements being controlled by a mechanism which firstly ensures the tool approach movement for the first pass, then the successive advances of the tool from one pass to another, and secondly controls withdrawal of the tool after each pass, then complete disengagement of the tool after the final pass.

An object of the present invention is a simplified mode of connection between the transverse carriage and the mechanism which controls the movements of this carriage.

The present invention is a thread-cutting device for a parallel traversing and thread-cutting lathe, having a lathe saddle, a longitudinal carriage, the device including, mountable on the saddle, controlled by a cam and supporting a transverse carriage whose advancing movements are controlled by a mechanism against which the transverse carriage abuts under the action of resilient return members, and in which the transverse carriage abuts, under the action of these resilient return members, against a movable ram guided transversely on the lathe saddle and controlled by a lever pivoted on an eccentric and to which a first cam applies, before each thread-cutting pass, a similar pivoting moment in the direction of advance of the ram, said eccentric being controlled by a second cam which after each thread-cutting pass applies an angular movement of equal amplitude towards a new tilted position of the control lever, the number of these angular movements of the eccentric being adjustable.

An embodiment of the present invention will now be described, by way of example, with reference to the accompanying drawings, in which:

FIGURE 1 is a general view in elevation of a thread-cutting device according to the present invention along a section on I—I of FIGURE 2;
FIGURE 2 is a general view in transverse section on II—II of FIGURE 1;
FIGURE 3 is a partial view in transverse section on III—III in FIGURE 1;
FIGURE 4 is a partial section view on IV—IV in FIGURE 2;
FIGURE 5 is an end view showing the control of the axis of the transverse advance shaft; and
FIGURE 6 is a partial section view on VI—VI of FIGURE 5.

The traversing or thread-cutting lathe represented comprises a saddle 1 guided on a bed 2 and supporting a longitudinal carriage 3, itself guided by slides 4 (FIGURE 2) and on which is mounted a transverse carriage 6, guided by slides 5 (FIGURE 5). Thread-cutting tool 7 is mounted on a tool carrier 8, fixed on the transverse carriage 6. The saddle 1 can be locked on bed 2 by means of catches 9 during thread-cutting operations.

The advance motion of longitudinal carriage 3 is controlled by a cam 10 keyed on shaft 11 mounted in a support 12 integral with saddle 1, and driven by means of a pair of pinions 13, 14 from a splined shaft 15 connected to lathe spindle 16 by a transmission, not shown, whose drive ratio may be chosen according to the thread pitch being formed, e.g. by means of a threading box in a parallel traversing and thread-cutting lathe, not shown. Cam 10 acts on a roller 17 carried by longitudinal carriage 3 so as to displace the carriage against the action of a spring 18 coupled at 19 to saddle 1 (FIGURE 1).

The transverse carriage 6 is contantly urged towards the tool withdrawn position by a spring 20, coupled at 21 to longitudinal carriage 3 (FIGURE 2).

In accordance with the invention, control of the periodic advance movements of transverse carriage 6 is effected as follows:

Under the action of spring 20, a carriage 6 is backed against a rule 22 through a roller 23 carried by a ram 24 guided, without being able to turn, in a slideway 25 itself guided in a casing 26 integral with saddle 1 (FIGURE 2). Rule 22 is mounted on a pin 27 carried by the transverse carriage 6, and two set-screws 29 (FIGURE 4) enable the rule to be fixed in its working position, parallel or not to the axis of the work-piece being threaded, for forming cylindrical or conical threads. The axial position of ram 24 in slideway 25 is adjustable by means of a screw 30 operated by a handle 31 provided with vernier 32.

A lever 33, one end of which is engaged in a notch 34 formed in the slideway 25 has at its other end a roller 35 supported against a cam 36 keyed on to shaft 11. The lever 33, is pivoted at its center on an eccentric portion 37 of a shaft 38 (FIGURE 1), subjected to the action of an angular return spring 39 (FIGURE 3) affixed at 40 to support 12 and connected by a cable 41 to the perimeter of a pulley 42 keyed on shaft 38. On this are keyed a graduated disc 43 and a sector 44 provided with ratchet teeth. This sector is mounted on the splined end of shaft 38 so as to be able to occupy various angular positions thereon, and under the return action of spring 39 abuts against a stop 45 integral with the saddle (FIGURE 5).

The teeth of sector 44 co-operate on the one hand with a retaining pawl 46 pivoted about a fixed pivot 47 and on the other hand with a drive pawl 48 pivoted on a pivot 49 carried by an oscillating arm 50, pivoted at 51. Arm 50 is subjected to the action of a spring 52 in a direction to force a roller 53 mounted on arm 50 against a cam 54 keyed on to shaft 11 (FIGURE 5).

A lever 55, pivoted at 56 and subjected to the action of spring 57, is held in its raised position, shown in FIG- URE 5, by a release bolt 58, pivoted at 59 and one end 60 of which is adapted to co-operate with a stop lug 61 mounted on the toothed sector 44. When lever 55 is freed from bolt 58 it acts on the free extensions of pawls 46 and 48 so as to disengage these pawls from toothed sector 44.

The stop lug 61 is provided with a tooth 61a (FIGURE 6) adapted to engage in the teeth of sector 44, and a catch 61b centered in the rim of this sector. The lug 61 is immobilized by means of a screw 62 adapted to be screwed into any of a plurality of tapped holes 63 in toothed sector 44, through an aperture 61c formed in lug 61.

Toothed sector 44 is provided with a scale 44a, co-operating with a reference line 61d on lug, and with a reference line 44b, co-operating with a scale 43a on disc 43.

The scale 44a corresponds to the pitch of the teeth on toothed sector 44, and each marking of scale 43a defines an angular position of shaft 38, and consequently of the eccentric portion 37 on this shaft, for a specific setting angle of toothed sector 44 on shaft 38, in the position of abutment against its stop 45.

The thread-cutting device operates as follows:

With the lathe at rest, the transverse carriage 6 is urged by its spring 20 against the roller 23 of ram 24 and occupies a withdrawn position adjustable by means of stop screw 63 of slideway 25.

When the lathe is set in operation, and for each revolution of shaft 11, cam 10 controls the displacement of longitudinal carriage 3, while cam 36 through the intermediary of lever 33 controls successive advance and withdrawal movements of transverse carriage 6. With lever 55 in its lowered position, i.e. free of bolt 58, the pawls 46 and 48 are not engaged with toothed sector 44. The action of cam 54 on lever 50 is inoperative, and lever 33 pivots about the eccentric portion 37 whose angular position is defined by the position of toothed sector 44 against stop 45. The point of the tool thus describes a constant rectangular path.

By means of handle 31 one can thus make tool 7 advance until it contacts a workpiece 64 being threaded at the end of each transverse advance movement. When through manual operation the lever 55 is brought into its position of engagement with bolt 58, pawls 46 and 48 engage in the teeth of sector 44, and for each rotation of shaft 11 the cam 54 causes an angular movement of shaft 38 corresponding to one tooth of sector 44, the angular setting of cam 54 being such that this movement is effected during the withdrawal movement of transverse carriage 6, controlled by cam 36.

At each rotation of shaft 11, the eccentric portion 37 of shaft 38 occupies a new position, and lever 33 can occasion a fresh advance of transverse carriage 6 after each thread-cutting pass, until the moment when lug 61 acts on the end 60 of bolt 58. This frees lever 55 which, withdrawn by spring 57, causes disengagement of ratchets 46 and 48. Shaft 38 is then returned by spring 39 to the position of engagement of toothed sector 44 against the stop 45, and the eccentric portion 37 returns to its initial angular position of disengagement from tool 7. For each new thread-cutting operation it will suffice to operate lever 55 to engage it on bolt 58.

The number of thread-cutting passes depends therefore on the angular position of lug 61 on toothed sector 44. To determine the number of passes corresponding to the depth of thread being formed, a nomograph is used which for each angle of initial angular setting of shaft 38, read with the aid of reference line 44b of toothed sector 44 on the scale 43a of the disc 43, gives the angular setting of lug 61, read with the aid of reference line 61d of the lug on the scale 44a of toothed sector 44. One can in this manner select an initial setting angle of shaft 38 such that the depth of successive passes decreases from one to another, at least for the terminal passes, thus providing a final finishing pass with a minimum advance.

Because of the pivoting on an eccentric of the lever controlling the advance movements, the thread-cutting device in accordance with the invention enables transverse advances of adjustable amplitude to be made, with the intervention only of constant amplitude movements controlled by constant lift cams.

The thread-cutting device as just described may naturally be modified in the details of embodiment, or completed by any useful accessory member, while remaining within the scope of the invention.

What is claimed is:

1. In a screw thread-cutting machine having a frame and a rotary workpiece-carrying spindle, a longitudinal carriage slidably mounted on said frame, a first cam rotatably mounted in said frame, a first cam follower carried by said longitudinal carriage to engage said first cam whereby the longitudinal carriage is driven by said first cam, resilient means for urging said longitudinal carriage in a direction to engage said first cam follower against said first cam, a transverse carriage slidably mounted on said longitudinal carriage, a second cam rotatably mounted in said frame, a second cam follower engaging said second cam, a lever carrying said second cam follower and including a portion forming an abutment for said transverse carriage, resilient means urging said transverse carriage against said abutment, an eccentric shaft rotatably mounted in said frame and on which said lever is pivotally mounted, said lever being pivotally movable by said second cam about said eccentric shaft to move said transverse carriage, a third cam rotatably mounted in said frame, a ratchet device actuated by said third cam to impart successive angular incremental movements to said eccentric shaft and thereby vary the pivotal movement of the lever and hence the position of the transverse carriage on said longitudinal carriage during successive rotations of the second cam, and a common drive shaft for rotating all said three cams in unison.

2. A machine according to claim 1, wherein all said three cams are carried by said common shaft.

3. A machine according to claim 1 comprising a manual feed device between said abutment and said transverse carriage.

4. A machine according to claim 3 wherein said manual feed device comprises a casing slidably mounted on said frame and engaging said abutment, a ram slidably mounted in said casing, a manually operable screw and nut connection between said casing and said ram, a roller carried by said ram, and a rule adjustably carried by said transverse carriage and engaging said roller.

References Cited

UNITED STATES PATENTS

| | | | |
|---|---|---|---|
| 2,248,692 | 7/1941 | Adcock | 82—5 |
| 2,882,776 | 4/1959 | Jeanneret | 82—5 |
| 3,016,777 | 1/1962 | Garombo | 82—5 |
| 3,073,194 | 1/1963 | Ciccarelli | 82—5 |
| 3,102,445 | 9/1963 | Elledge | 82—5 |
| 3,192,806 | 7/1965 | Bissee | 82—5 |
| 3,199,385 | 8/1965 | Bechler | 82—5 |
| 3,363,491 | 1/1968 | George | 82—5 |

HARRISON L. HINSON, Primary Examiner